Jan. 4, 1949. J. O. PHELPS ET AL 2,458,022
ALTIMETER
Filed Aug. 9, 1944 4 Sheets-Sheet 1

James O. Phelps.
George W. Cottrill,
Inventors.
Haynes and Koenig
Attorneys.

Jan. 4, 1949.   J. O. PHELPS ET AL   2,458,022
ALTIMETER
Filed Aug. 9, 1944   4 Sheets-Sheet 2

James O. Phelps,
George W. Cottrill,
Inventors.
Haynes and Koenig,
Attorneys.

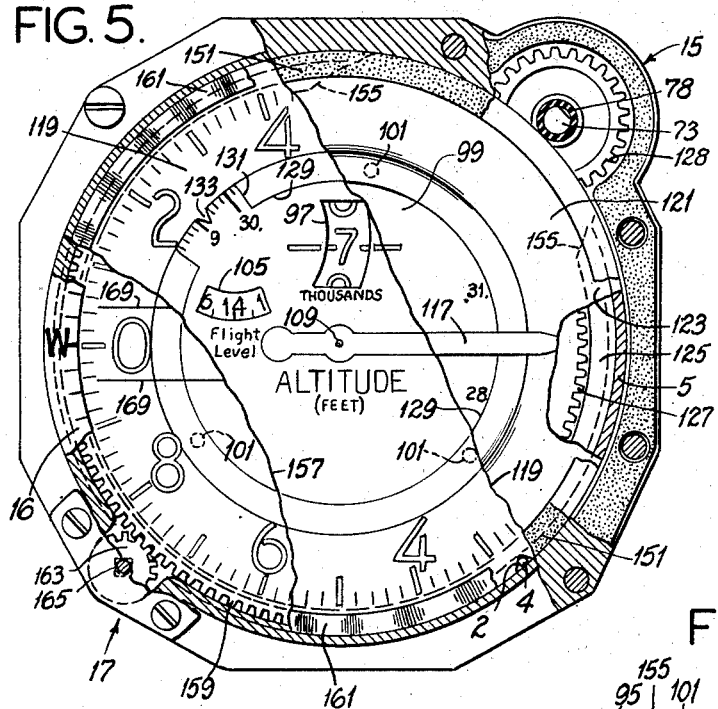
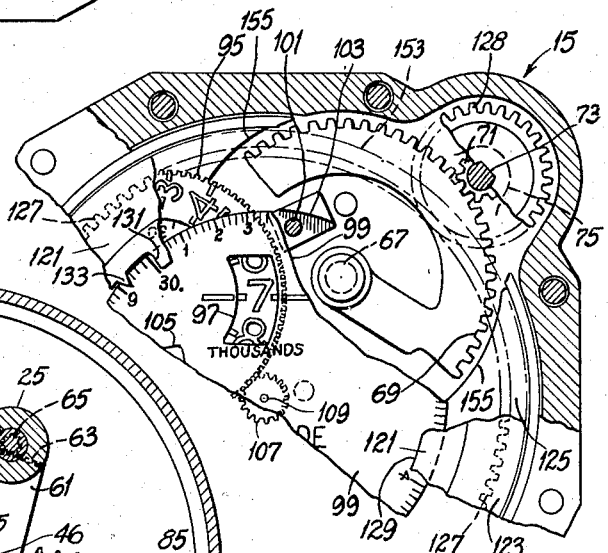
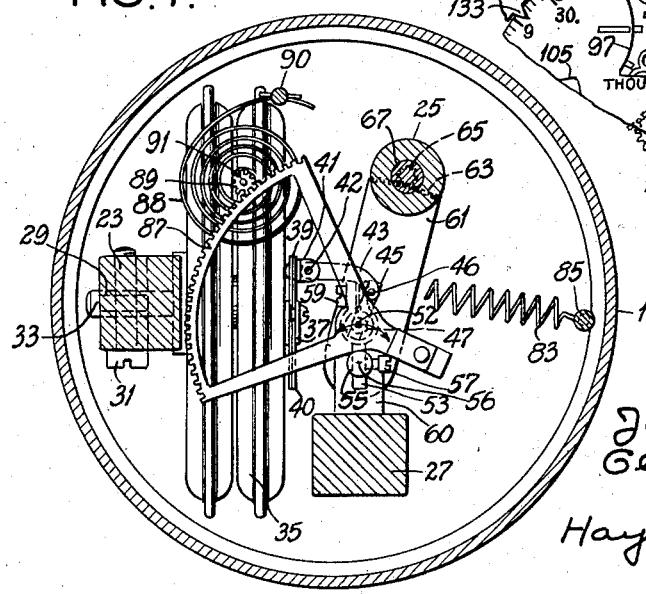

Jan. 4, 1949.  J. O. PHELPS ET AL  2,458,022
ALTIMETER
Filed Aug. 9, 1944  4 Sheets-Sheet 4
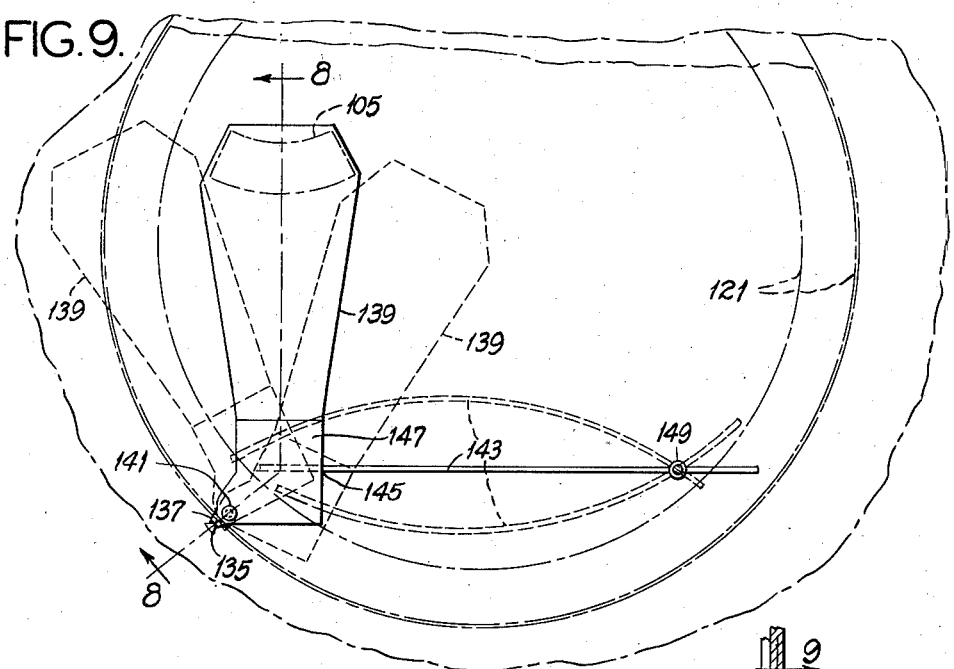
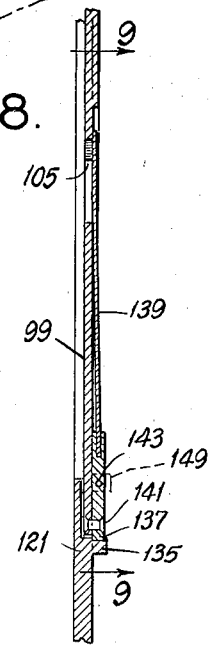
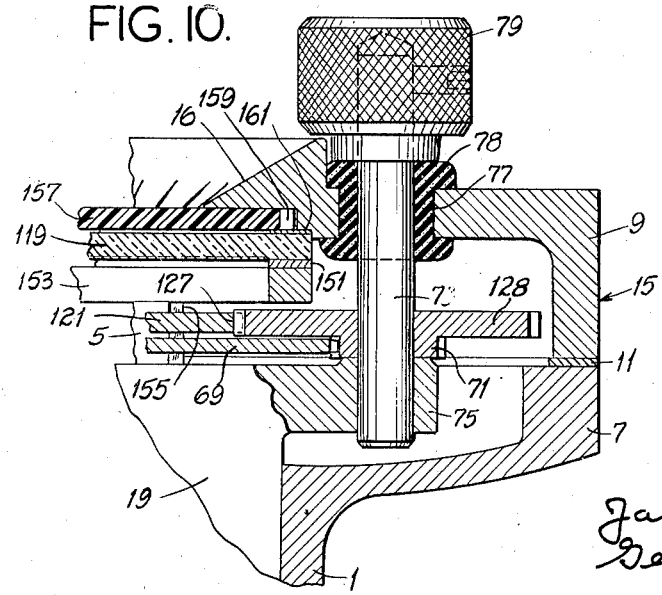
James O. Phelps,
George W. Cottrill,
Inventors.
Haynes and Koenig,
Attorneys.

Patented Jan. 4, 1949

2,458,022

UNITED STATES PATENT OFFICE 2,458,022

ALTIMETER

James O. Phelps, Richmond Heights, and George W. Cottrill, University City, Mo., assignors to Airpath Instrument Company, St. Louis, Mo., a corporation of Missouri Application August 9, 1944, Serial No. 548,780

19 Claims. (Cl. 73—387)

This invention relates to altimeters, and with regard to certain more specific features, to a settable, flight level indicating altimeter, particularly for aviation use.

Among the several objects of the invention may be noted the provision of a simple, compact and reliable instrument which coordinates flight level indications, a practically readable altitude indication and compass bearing; the provision of an instrument of the class described having only one simple readable pointer; the provision of an instrument of this class which may be set to indicate flight levels only under assumed standard barometric conditions but which under setting for non-standard barometric conditions is readable only as an altimeter, thereby substantially reducing confusion in reading the instrument under practical flight conditions; and the provision of apparatus of the class described employing a very simple mechanical linkage for making desired barometric and temperature corrections. Other objects will be in part obvious and in part pointed out hereinafter.

The invention is an improvement upon the structure shown in U. S. Patent 2,328,559, dated September 7, 1943.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a plan view of the instrument set for operating under assumed standard barometric conditions with an east compass bearing at 7,000 ft. altitude, and an arbitrary flight level No. 14;

Fig. 5 is a horizontal section taken substantially along line 5—5 of Fig. 2, various parts being broken away to show features at various adjacent levels;

Fig. 6 is a horizontal section taken substantially at line 6—6 of Fig. 2, portions being broken away;

Fig. 7 is a horizontal section taken substantially on line 7—7 of Fig. 2;

Fig. 8 is an enlarged vertical section taken substantially on line 8—8 of Fig. 1;

Fig. 9 is an enlarged vertical section taken on line 9—9 of Fig. 8; and

Fig. 10 is an enlarged vertical section taken substantially on line 10—10 of Fig. 1.

Similar reference characters indicate corresponding parts throughout the several views of the drawings.

Figure 1:
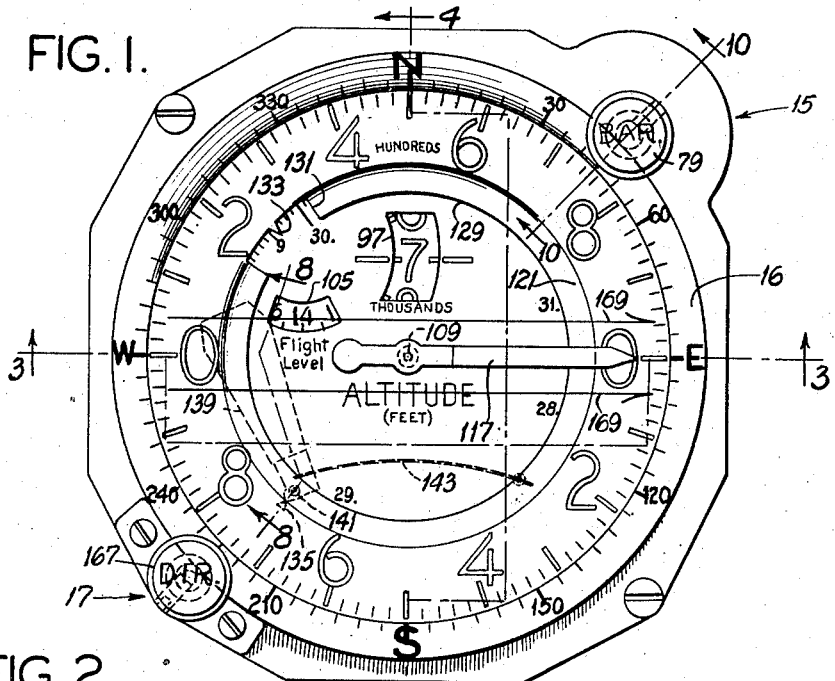

Present day flight level indicators coordinated with compass bearing means lack means for reading true altitude when desired. Mental computations must be made if the device is to be used as an altimeter and this is impractical. A difficult problem arises when attempt is made to coordinate compass bearing means with practically readable altitude indicating means. The present invention solves this problem.

Also, the present instrument, when set for assumed standard barometric conditions, is automatically conditioned for operation as a flight level indicator. When set according to the true prevailing barometric conditions it becomes automatically conditioned for operation only as a true altimeter readable directly to less than the nearest twenty feet of true altitude above the terrain. Furthermore, the device when operated either as a flight level indicator or as an altimeter is easily read under the respective conditions without confusion. In addition, it is relatively simple in mechanical construction and is arranged for easy, economical assembly.

The invention among other things is designed to meet certain rules regarding arbitrarily assigned flight level numbers. These, for example, are assigned to the cardinal compass points north, east, south and west respectively. These flight level numbers correspond to predetermined assigned altitudes in feet which prevail for a standard barometer at sea level. Exemplary relationships are shown in the following table, standard barometric pressure at sea level being assumed at 29.92 inches of mercury, but it is to be understood that the invention is useful by suitable adaptation to other arbitrary rules.

Table A

| Flight Level No. | | | | Altitude in Feet | Compass Bearing | | | |
|---|---|---|---|---|---|---|---|---|
| 0 | | | | 0 | 0 | | | |
| 1 | | | | 500 | N | | | |
| | 2 | | | 1,000 | | E | | |
| | | 3 | | 1,500 | | | S | |
| | | | 4 | 2,000 | | | | W |
| 5 | | | | 2,500 | N | | | |
| | 6 | | | 3,000 | | E | | |
| | | 7 | | 3,500 | | | S | |
| | | | 8 | 4,000 | | | | W |
| 9 | | | | 4,500 | N | | | |
| | 10 | | | 5,000 | | E | | |
| | | 11 | | 5,500 | | | S | |
| | | | 12 | 6,000 | | | | W |
| 13 | | | | 6,500 | N | | | |
| | 14 | | | 7,000 | | E | | |
| | | 15 | | 7,500 | | | S | |
| | | | 16 | 8,000 | | | | W |
| 17 | | | | 8,500 | N | | | |
| | 18 | | | 9,000 | | E | | |
| | | 19 | | 9,500 | | | S | |
| | | | 20 | 10,000 | | | | W |
| 21 | | | | 10,500 | N | | | |
| | 22 | | | 11,000 | | E | | |
| | | 23 | | 11,500 | | | S | |
| | | | 24 | 12,000 | | | | W |
| 25 | | | | 12,500 | N | | | |
| | 26 | | | 13,000 | | E | | |
| | | 27 | | 13,500 | | | S | |
| | | | 28 | 14,000 | | | | W |
| 29 | | | | 14,500 | N | | | |
| | 30 | | | 15,000 | | E | | |
| | | 31 | | 15,500 | | | S | |
| | | | 32 | 16,000 | | | | W |

It will be seen from the above table A, which for convenience is limited to a maximum altitude of 16,000 ft., that 32 arbitrary flight level numbers have been assigned. Flights along north compass bearings are to be made at the even thousands of feet (including zero), plus 500. To these are assigned the flight levels of 1, 5, 9, 13 etc. South compass bearing flights are to be made at the odd thousands of feet altitude plus 500 ft., to which the flight levels 3, 7, 11, 15 etc. are assigned. East compass bearing flights are to be made at the odd thousands of feet altitude, to which flight levels 2, 6, 10, 14 etc. are assigned. The west compass bearing flights are to be made at the even thousands of feet altitude, to which flight levels 4, 8, 12, 16 etc. are assigned.

Thus when a ship bears north, it should always be on an even altitude in thousands of feet plus 500 and will have been assigned one of the flight levels 1, 5, 9, 13 etc. The other assignments that may be made for the other various bearings are clear from the table. These flight levels may be assigned at the airport from which the ship leaves, by radio or otherwise. The pilot is expected to maintain the assigned flight level. This requires him to coordinate compass bearings and flight level numbers. True altitude will, with respect to the terrain, vary according to changes in atmospheric pressure. This is because in the table arbitrary altitudes given are for an arbitrarily chosen standard barometric pressure of 29.92 in hg. at sea level. Thus every pilot flying under such conditions is at a given relative elevation with respect to all other pilots in the air who are obeying these rules, although all of their absolute altitudes may vary.

The present invention in addition to allowing a pilot to fly conveniently according to the above table A, also provides him with means whereby he may convert his instrument from a mere flight level indicator to one which reads true altitudes under the true barometric conditions prevailing. The flight level indicating features are obliterated under such conditions. This is to avoid confusion. The true altitude readings are then conveniently read to the necessary degree of accuracy. This allows a pilot to descend safely and without confusion through the various flight levels that he needs to negotiate in order to land, and with a complete knowledge of his precise elevational relationship to the field which he is approaching.

Referring now more particularly to Figs. 1–4, there is shown at numeral 1 an airtight case having a conduit connection 3 with a suitable static pressure tube (not shown) for transferring atmospheric pressures to the interior of the case. On its upper edge the case carries an elevated rim 5 and a flange 7. A bezel ring 9 cooperates with the rim 5 and flange 7. A gasket 11 seals the ring to the case and studs 13 hold it in place. A beveled bezel 16 is marked with the cardinal compass points as shown and also in five degree intervals therebetween. The flange 7 and the bezel ring 9 carry extending pocket portions indicated generally at numerals 15 and 17 for accommodating adjusting mechanisms which will be described later.

Figure 3:
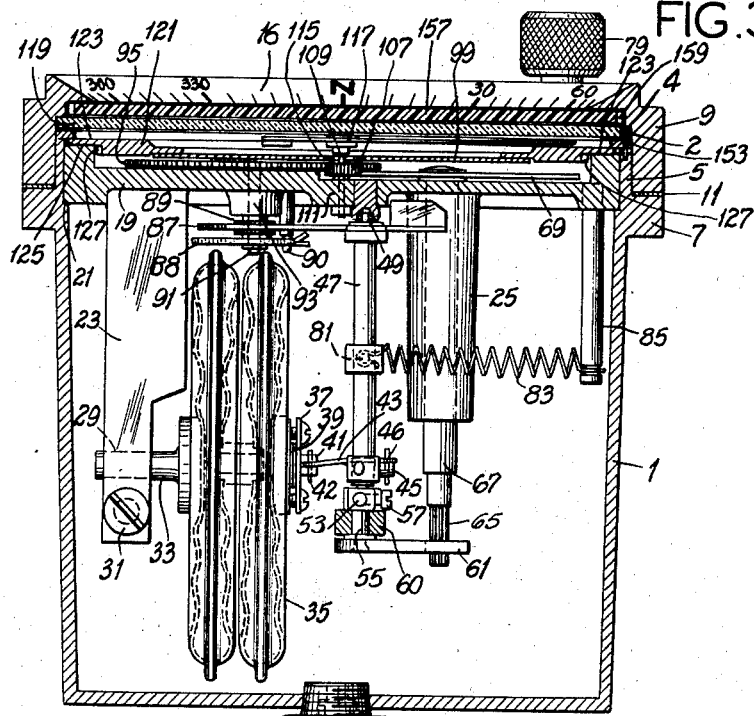
Fig. 3 is a vertical section taken substantially on line 3—3 of Fig. 1, parts being broken away behind the section to show certain details.
Figure 4:
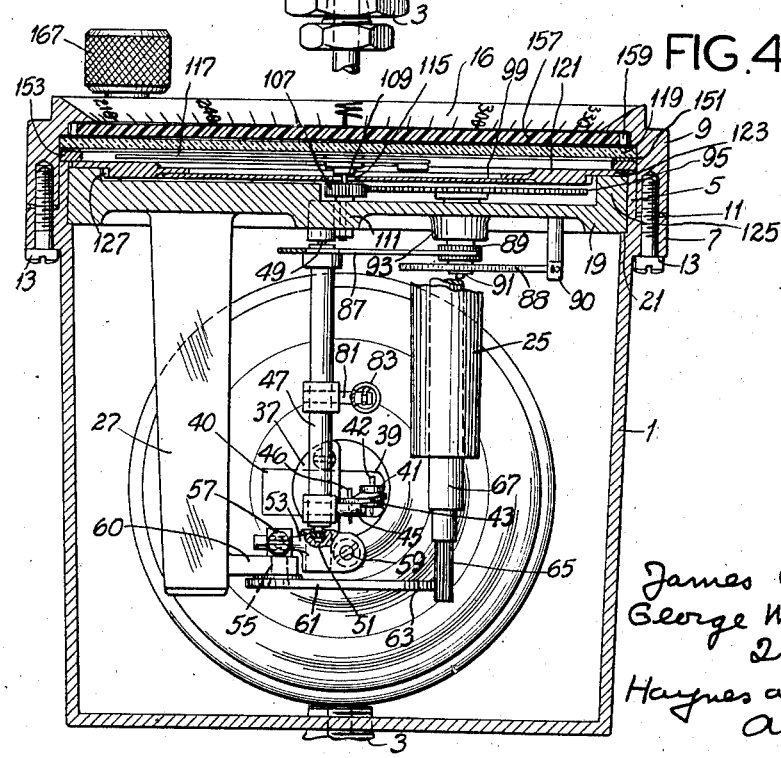
Fig. 4 is a vertical section taken substantially on line 4—4 of Fig. 1.

Inside of the case 1 is mounted a frame which has a spider part 19 resting upon a shoulder 21. Extending downward from the spider 19 is a post 23 forming a support for aneroid parts to be described. Extending downward from the spider 19 is also an elongate bearing post 25. Posts 23 and 25 are shown in Fig. 3. Another post 27 is shown in Fig. 4 and serves as an outboard support for a drive mechanism to be described. A fourth post 85 shown in Fig. 3 anchors a spring 83. These posts 23, 25, 27 and 85 constitute all of the main extensions from the spider 19.

The post 23 is split as shown at 29 (Figs. 3 and 7) and provided with a screw clamp 31 for holding a supporting stud 33 located on one side of a double-cell, evacuated aneroid element 35. This aneroid element is the prime mover which responds to barometric pressure changes. A clamp 37 fastens to the other end of the aneroid element one portion of a bimetallic thermostatic strip 39. This strip has its component of higher coefficient of expansion located away from the aneroid 35. The length of the strip is enough as shown at 40 (Figs. 3 and 7) for initially adjustably positioning it in the clamp 37 before tightening the latter. The end of the strip 39 is provided with a clevis 41 for pivoting to the strip at center 42 a link 43. At the other end this link 43 is pivoted at center 46 to a lever 45. Lever 45 extends from a transmission shaft 47. This shaft 47 has one fixed bearing 49 in the spider 19. At the other end in a lever 53 it has a movable bearing 51. Both of the bearings 49 and 51 are preferably of the jeweled variety. It is important for reasons which will appear that they not only permit rotary motion of shaft 47 around its axis but some angular motion of the axis of shaft 47. The lever 53 is clamped to a rotary pin 55. The clamp 57 is for adjustably positioning the arm 53. The arm 53 also has a clamp 59 for containing the bearing 51.

The rotary pin 55 is carried on an arm 60 of the post 27. The pin 55 has attached to it a sector gear 61 which has teeth 63 engaging the teeth of pinion 65. The latter is carried upon a rotary shaft 67 borne in said post 25. This shaft 67 passes through the post 25 to the front of the spider 19 where it carries an adjustable sector gear 69 as shown best in Fig. 6. This sector gear 69 meshes with a pinion 71 carried on a shaft 73. The latter is borne in boss 75 forming an extension from the spider 19. This boss 75 is pocketed in the extension 15, the latter having a solid enclosing floor. Therefore no leakage of air can occur at this bearing. This is best shown in Fig. 10. On the other side the shaft 73 passes through an opening 77 in the bezel ring 9. The opening 77 is packed around the shaft 73 by means of a rubber grommet 78 which resists infiltration of air. Outside of the ring 9 the shaft 73 is provided with a knurled control knob 79 for setting purposes.

From the above it is clear that by turning the knob 79 and rotating the shaft 73, movement is transmitted through the gear train 71 and 69 to the shaft 67, then through the gears 65 and 61 to provide rotary motion of the pin 55. This rocks the lever 53 and consequently rocks the end bearing 51 of the shaft 47. It will be remembered that the other bearing 49 of this shaft 47 is stationary. A slight amount of universal movement permitted in the bearings 49 and 51 allows for the resulting angular movement of the axis of shaft 47 brought about by the swinging of the center 52 of bearing 51. The direction of swing of the bearing 51 is indicated by the double-ended arrow in Fig. 7. The adjustable angling of the axis of shaft 47 causes an action of the lever 45 which is in effect a rotary displacement around the center line of the shaft 47. This in turn rotates shaft 47 on its axis. The purpose of this will appear.

The shaft 47 is provided with an intermediate arm 81 to the end of which is fastened one end of the spring 83. The other end of the spring is fastened to the post 85 which extends from said spider 19. Thus the shaft 47 is angularly biased by the spring 83 to cause a pull upon the end of the thermostatic strip 39 and hence an initial pull is applied to the aneroid (see Fig. 3). This spring takes up the slack in the shaft 47 and aneroid mechanism, so that there is no play in the bearings 49 and 51.

From Fig. 7 the essence of the improved control linkage is most clear. In this figure the center of attachment of link 43 to the thermostatic strip 39 is shown at 42. Its center of attachment to the lever 45 is shown at 46. The center of the bearing 51 is shown at 52. The center of the rocking pin 55 is shown at 56. Clearly, if centers 52 and 56 are stationary, as during periods of non-adjustment, then motion of center 42 in response to activity of the aneroid element 35 causes motion of center 46 and angular movement of the lever 45 and hence angular movement of the shaft 47. The final effect of this movement will be traced later. On the other hand, considering centers 42 and 46 relatively fixed (as in the case of a stationary barometer) and an adjustment being carried out from knob 79, such adjustment causes swinging of the center 52 around the center 56, thus pivoting the lever 45 around the center 46. This causes adjusting rotary motion of the shaft around center 52 in addition to the axial angular movement of the shaft 47 caused by traverse of the center 52 over the arc represented by the double-headed arrow.

At the end of the shaft 47 adjacent to the bearing 49 is attached a sector gear 87 which meshes with a pinion 89 carried on a pin 91 (Figs. 4 and 7). Backlash is taken out of the tooth engagement between the pinion 89 and the sector gear 87 by means of a hair spring 88 attached to the pin 91 and anchored to a post 90 extending from the spider 19. Pin 91 passes through a bearing 93 and the spider 19. This pin on the other side of the spider carries a gear plate 95, the face of which is provided with index numbers. The outer ring of characters represents thousands of feet elevation. The inner ring of characters represents flight levels. For every one thousand-foot number there is a corresponding flight level number, double in magnitude.

The elevation indicating numbers are exposed successively under a window 97 in a fixed plate 99 (see Fig. 6). This plate is supported upon suitable bosses on the front of the spider 19 by means of studs 101. One each of the supporting bosses and studs is shown for example at 103 in Fig. 6. The plate 99 is by this means held in a plane above the face of gear plate 95. On its edge it carries a numerical barometer scale. A second window 105 in the fixed plate 99 is provided for exposing separate flight level numbers (see Figs. 1 and 5). The angular relationship between the successive outer one thousand feet altitude numbers and the inner row of flight level numbers is such that when a given altitude number appears under window 97, a flight level number will appear under window 105 which is double the magnitude of the other.

The teeth on the face gear 95 mesh with a central pinion 107 carried upon a pin 109, the latter being supported in a bearing 111 at the center of the spider 19. This pin 109 extends through a central opening 115 in the fixed plate 99. The outer end of the pin 109 carries a pointer 117 which points to the compass bearings on the bezel 16. It also points to altitude indicating numerals carried on the under face of a stationary circular glass window 119. This glass is provided with a notch 2 (Figs. 3 and 5) which engages with a pin 4, the latter being anchored in the rim 5.

The pointer 117 is located in a plane above a barometer index ring 121, the latter having a radial flange 123 to provide a bearing surface on a top rim 125 of the spider 19. Inside of the rim 125 teeth 127 are provided on the back of ring 121. These mesh with another gear 128 which is carried on said shaft 73. Thus by turning the knob 79 a second gear train is brought into operation, namely, gears 128 and 127, thus turning the barometer index ring 121. The ring 121 has an inner rim 129 which is annular in form as indicated in Fig. 1. It is notched out as shown at 131 and the base of the notch is provided with a pointer 133 which plays over the barometric scale marked off on the rim of plate 99. The scale is marked off in inches of mercury. Tenths and hundredths of inches of mercury are marked under the rim 129 and are exposed only by registry of notch 131. This avoids confusing additional fractional scale markers which would otherwise appear. Whole-inch indices are preferably always exposed since they are not confusing. If desired they also may be placed under the rim 129 and exposed only by the notch 131.

The barometric pointer ring carries on its under side a camming lug 135 (see Figs. 8 and 9) which during adjustment of the ring is engageable with a finger 137 of a semaphore shield 139, the latter being pivoted at 141 to the bottom of the window plate 99. This shield 139 swings across the bottom of the flight level window 105. In vertical position (solid lines, Fig. 9) it covers the window and in the alternative dotted-line positions uncovers it. A very small angular movement of the adjusting ring 121 serves to uncover the window 105. The lug 135 is so positioned with respect to the pointer 133 on ring 121 that the shield 139 is in either of its dotted-line open positions only when the pointer 133 is at or very near the standard barometer setting, namely when indicating 29.92 in. hg., as shown in Figs. 1 and 9. In other words, a flight level reading may be taken only when the instrument is set for the assumed standard barometer.

In order normally to hold the shield 139 in its covering position underneath the window 105 (when disengaged by the lug 135), a piano-wire spring 143 is attached to its base 147 as at 145 (Fig. 9). This spring reaches to and through a hole in a rotary pivot 149 extending from beneath the plate 99. Thus when the finger 137 of the shield 139 is released by the lug 135, the shield 139 will spring from either of its dotted-line positions shown in Fig. 9 to the solid-line position. Only one of the dotted-line positions of the shield 139 is shown in Fig. 1. It will be understood that two of them occur, depending upon what direction the finger 137 is approached by the lug 135. Referring to Fig. 1, if it is approached from the top, then the shield 139 assumes the dotted-line position shown. If it were approached from the bottom, the shield would assume the other dotted-line position not shown in Fig. 1 but shown in Fig. 9.

As above mentioned, the stationary glass 119 carries index numerals to which the pointer 117 relates. These numerals indicate hundreds of feet of elevation plus suitable subdivisions of twenty feet each which may be further subdivided by interpolation. The dial has two marked segments, each starting with zero on opposite horizontal sides of the instrument and extending to 1,000 by 100 ft. marked increments, making a 1,000 ft. total for each 180° of index on the glass (Fig. 1). The reason for this double scale will appear.

The glass 119 is supported on a packing ring 151 which in turn is supported upon a seating ring 153. The ring 153 is supported upon the rim 5. It spans a gap 155 in the rim 5 which gap is needed for passage of the gear trains 69, 71 and 128, 127, above mentioned. The bezel 16 of the bezel ring 9 extends over the edge of a circular plastic window sheet 157. This sheet on its edge rests upon but is rotary with respect to a packing ring 161. This ring, beyond the edge of the window 157 is gripped between the bezel 16 and the glass 119, thus sealing against air leakage. As indicated in Fig. 5, the ring 151 is slightly convoluted so that when the bezel ring 9 is drawn down by the studs 13, all of the non-rotary parts 119, 151 and 153 will be tensioned against vibration.

Figure 2:
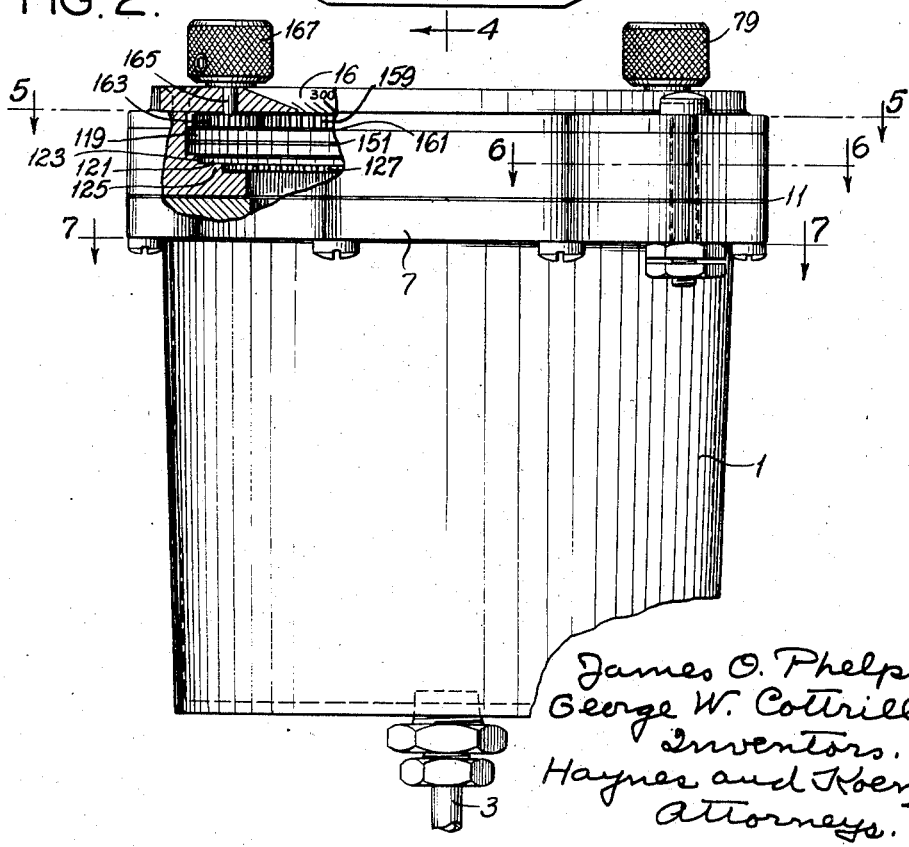
Fig. 2 is a front elevation of Fig. 1 parts being broken away to show certain details.

From Fig. 10 it will be noted that the edge of the plastic window 157 is provided with teeth 159. These teeth are meshed with a pinion 163 located on a pin 165 which passes through the bezel ring 9 and is located in the region of said extension 17 (Figs. 1 and 2). An outside knurled knob 167 provides means for turning the pinion 163 and hence the plastic window 157. On the inner surface of this window are spaced guide arrows 169 between which the pointer 117 may be aligned.

Mechanical operation in response to changes in atmospheric pressure is as follows:

Expansion or contraction of the aneroid element 35 results in linear movement of the clevis 41 which transmits motion through the link 43 to the lever 45, thus rotating the shaft 47 in the bearings 49 and 51. Spring 83 takes up the slack. This rotary motion is transmitted to the sector gear 87 which drives pinion 89. This rotates the counter gear plate 95, thus presenting behind window 97 a figure representing thousands of feet of elevation. At the same time it presents the proper figure behind the window 105 (when opened) representing the corresponding flight level by a number twice the value of the number behind the window 97. At the same time the gear 95 through pinion 107 drives the hand or pointer 117 to indicate the additional 100 ft. values of elevation, along with their interpolations. The gear ratio between gears 95 and pinion 107 is such that for each 1,000 ft. of change indicated through the window 97, the pointer 117 rotates 180°. The upper segment of figures on the glass 119 will indicate values beyond any even number of thousands of feet represented through window 97; whereas the lower segment of figures on the glass 119 will register values beyond odd thousands of feet represented through window 97.

The bimetallic strip 39 compensates for temperature changes in the aneroid element. For example, a higher temperature which expands any residuum of gas in aneroid 35 tending to push clevis 41 out too far is offset by bending of the bimetallic strip 39 toward the aneroid.

Operation to adjust for barometric changes is accomplished as follows:

The knob 79 is turned so that the pinion 71 (Fig. 6) drives the sector gear 69. This drives shaft 67 and pinion 65. This in turn drives the sector gear 61 which rotates the pin 55 and the lever 53. This swings the lower bearing 51 of shaft 47, thus rocking the shaft angularly from end to end, causing the endwise motion indicated by the double arrows in Fig. 7.

This has the effect not only of angularly swinging the axis of the shaft but of providing it with a component of rotation around this axis. The reason for this has above been made clear. The result is that the sector gear 87 is rotated. This drives the pinion 89 and causes the counter gear 95 to move and indicate both a corrected elevation and flight level. In other words, true elevation from sea level is obtained by correcting an amount corresponding to the equivalent elevational error brought about by barometric changes. The required amount of adjustment is indicated through the operation of the gear 128 on the teeth 127 of barometric indicating ring 121. This causes the pointer 133 to indicate the barometer value to which the setting has been made. As is known, altitude corrections for barometric changes are not in a straight line proportion. That is to say, one inch of mercury at sea level represents a smaller difference in elevation than one inch at altitudes above sea level. The linkage proportions and arrangements shown in the drawings establish proper relationships substantially to account for this inequality. Thus the pointer 133 indicates at the rim of the window plate 99 the barometric pressure prevailing according to a given adjustment. The scale on the rim of the plate 99 is even, while the amount of correction indicated by corrective movement of face gear plate 95, because of the character of the corrective linkage, varies with altitude. Furthermore, when the pointer 133 is at standard barometer (29.92 in. hg.) as indicated in Fig. 1, the lug 135 has caused the shield 139 to move away from the flight level window 105. At all other adjusted positions the shield 139 is caused to cover the window by spring 143.

The adjustable transmission mechanism is quite simple. An important feature to note in connection with it is that the end of the shaft 47 near the aneroid 35 is substantially swingable for adjustment purposes but the end near the fixed bearing 49 moves very little. It is at this end of small movement that the gear train 87, 89 is positioned. Therefore the meshing action between the gears 87 and 89 is not interfered with to any extent that is appreciable. Slight backlash introduced is taken up by the action of spring 88.

Complete functional operation, from the viewpoint of a pilot operating a plane with the device, is as follows:

Upon starting a trip the pilot determines his compass course from a suitable chart, and for example assuming that it is due east, he revolves the knob 167 until the arrow indicator band 169 on the plastic face 157 points toward the east compass point on the bezel 16, as in Fig. 1. The barometric indicator 133, through action of the knob 79, is set at standard barometer, namely, 29.92 in. hg., as indicated. The needle 117 may at this time be anywhere. This setting at standard barometer also causes the lug 135 to open the shield for exposing the flight level indications at window 105.

The pilot's flight level number is at this time assigned, which for an east course, according to table A, may be any of levels 2, 6, 10, 14, 18, 22, 26 or 30 for the instrument shown. As indicated in Fig. 1 the particular flight level 14 has been assigned, which accords to an altitude of 7,000 ft. above sea level, based upon a standard barometer, but under cruising conditions the fact that this altitude may be somewhat in error due to non-standard barometric conditions is inconsequential since all other pilots in the air are operating with the same error which properly relates them one to the other. The assignor of the flight level number of course makes sure that the general altitude is high enough to clear the terrain to be traveled. But the important thing to the pilot now is that he will be correctly related to other ships on other flight levels operating according to the rules. To fly properly, the pilot simply brings the proper flight level number "14" before the window 105 and the pointer 117 into the due east position shown, without manipulation of the instrument as such. This is done by elevating the ship. In other words, he brings the ship to an elevation whereby flight level number 14 is brought into view at the window 105 and whereby the pointer 117 moves into the previously set directing band 169, that is, pointing due east on the bezel 16 This may require several revolutions of the pointer 117. If a particular flight level is not assigned it is only important in order to obey the rules that the pilot be on one of the correct flight levels for his east compass course, that is to say, on any one of flight levels 2, 6, 10, 14, 18, 22, 26 or 30. Thus a pilot needs merely to glance at the instrument in adjusting the elevation of his ship and hold the latter such that the pointer 117 is simply between the pre-set lines 169 and the desired flight level number appearing at window 105. Each time that he changes flight levels, elevation is changed from one odd thousand to the next odd thousand. In Fig. 1 the instrument is shown being flown due east at flight level "14". It is to be understood that drift may require the pilot to fly a corrected bearing to maintain a desired track. This will require a slight change in elevation to accord with the required bearing and has the advantage that ships of different speeds operating over the same directional track will be at slightly different elevations because of the different bearings required by ships of different speeds operating in the same cross-wind. This advantage is not true when there is not a cross-wind but it is to be observed that under the latter conditions the trailing pilot has the leading pilot directly in his line of sight and under such conditions a collision between two ships even at the same altitude is rarely to be expected. Under all other conditions the ships will be automatically separated.

Each time that a 1,000 unit difference occurs in the window 97, the pointer 117 moves through 180°, thus indicating interpolations of less than 1,000 ft. It will now be clear that the upper segment of numbers on glass 119 reads the even thousands in window 97 plus 1,000 ft.; whereas the lower segment reads odd thousands of feet in the window 97 plus 1,000 by interpolation. Stated otherwise, either 180° segment coordinates with the pointer 117 to interpolate elevation but one group (the upper one) is associated with the even thousands of feet elevation in the thousands window 97 and the other group (the lower one) is associated with the odd thousands of feet elevation in the window 97. This allows of one pointer 117 being effective to indicate the relative elevation and the compass bearing at one and the same time.

Should a pilot during flight need to change his bearing he simply does so by turning the knob 167 to adjust the index band 169 for the desired new compass course, and then adjusts his ship to bring the needle into the band. For example, he may want to switch to a south course in which event guide 169 is placed vertically, pointing down. The ship is then brought up to a point where pointer 117 will be vertical and point downward. This will automatically place the ship on one of flight levels 3, 7, 11, 15, 19, 23, 27 or 31. The pilot may choose any of these and be safe, including any particular one that may be assigned by radio or otherwise. Intermediate compass bearings are handled similarly, the closest assigned flight level number appearing at window 105 and the actual flight level being fractionally correct due to the proper setting of the pointer 117. For example, if intermediate headings between the cardinal compass points are desired, these may be followed by setting the pointer 169. If in Fig. 1 the pointer 117 were to point south by east (150°), a ship level would be assumed two-thirds of the way between levels 14 and 15, flight level 15 being associated with a south course. The various flight levels of different airplanes will be spaced properly even though the barometric pressure changes, provided the pilot, as he should, allows the barometer pointer 133 to remain at standard barometer setting.

Assume next that the pilot wishes to land. For this purpose it is necessary that he know his absolute elevation with respect to the actual elevation of the airport. The latter he obtains by radio or knows from his chart. In order to obtain his own actual elevation as distinguished from elevation relative to other ships, the device to be used as an altimeter must be corrected for the prevailing barometer conditions. Assuming that he receives barometer information by radio, he sets the pointer 133 to indicate it. This is done from knob 79. This immediately moves the lug 135 from cooperation with the shield 139 and the latter springs over the flight level window 105. Any confusion from this source is therefore eliminated. The instrument thus instantly becomes converted into a simple true altimeter. The pilot now has before him an altimeter reading corrected for barometer and he simply reads the elevation from the thousand foot elevation data behind the window 97 and the interpolation on the periphery of the glass 119 as determined by the pointer 117. When his elevation is equal to that of the port which he is approaching he is in landing position. All confusion is avoided. The instrument may be referred to as a convertible altimeter and flight level indicator.

In the present embodiment the means for effecting traverse of the 1,000 ft. gross altitude indicating numbers behind window 97 may be referred to as a gross-unit altitude indicator. It will be understood that an equivalent of this would be the use of another pointer associated with the pointer 117 and traversing a dial indexed in 1,000 ft. intervals. Although this would be less simple to read, many of the advantages of the invention would be retained even with its employment. In other words, the construction could be used not unlike a clock wherein gross altitude indications would be shown by a pointer not unlike an hour hand and interpolated indications would be shown by the pointer 117 not unlike a minute hand.

It will also be clear that the multiple interpolated-unit ranges with which the pointer 117 cooperates may be made up in other multiples than the two shown, in order to provide a desired coordination between compass bearing and altitude reading in cases where other measuring units or rules are adopted than those shown in table A. For example, if hereafter flight level numbers might be coordinated with altitudes in other than gross 1,000 ft. intervals it might be necessary to spread a given interpolating scale over other than a 180° arc. Furthermore, in the metric system gross-unit increments behind window 97 may be different; also the interpolated-unit increments on glass 119.

Not only does the instrument have the operating advantages stated but it is structurally quite simple, particularly as regards the mechanical arrangement for barometer corrections whereby the one bearing 51 of the transmission linkage is simply swung.

Another feature of the mechanical simplicity is that the bearings for the various fixed and rotary parts above the spider 19 are arranged so that it is a simple matter to apply one after another from the top of the instrument as assembly proceeds.

It will be understood that the device may be adapted to the gyro autopilot as a means of automatically controlling the altitude being flown. This would be done by interconnecting the control knob 167 (which controls the course pointer 169) with the autopilot so that when the pointer 169 is set to the proper course, and hence to the proper altitude or flight level, the autopilot will send and hold the ship to a proper selected level.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. An altimeter comprising atmospheric pressure responsive means, a 1,000 ft. gross increment altitude indicator driven by said pressure responsive means, an altitude dial showing interpolated altitude increments of less than 1,000 ft., said dial being separated into two segments each of which indicates a gross total of 1,000 ft. by increments less than a thousand feet, a pointer driven from said pressure responsive means and traversing 360° of the dial for each 2,000 ft. indicated change in said gross thousand foot indicating means, and a compass dial adjacent to the altitude dial and also traversed by said pointer, two cardinal points of the compass dial being fixed adjacent to the ends of said two segments.

2. An altimeter comprising an atmospheric pressure responsive means, a fixed compass dial, a gross-unit altitude indicator and a pointer traversing the copass dial and both being driven by the pressure responsive means, an altitude dial laid off adjacent to the compass dial with units interpolating said gross units, said altitude dial being traversed by the pointer and being indexed with multiple numerical ranges each starting at zero at a cardinal compass point.

3. An altimeter comprising atmospheric pressure responsive means, a 1,000 ft. indicator driven by said pressure responsive means, a dial divided into two segments each of which has index means indicating a total of 1,000 ft. by increments of value of less than one thousand, a pointer driven from said pressure responsive means and having movement related to the 1,000 ft. indicating means so that it traverses 360° of the dial for each 2,000 ft. change in said thousand foot indicating means, and a fixed compass dial related to the pointer so that at certain even values of the 1,000 ft. indicating means one compass bearing is indicated, and whereby at certain other even values the opposite compass bearing is indicated.

4. An altimeter comprising atmospheric pressure responsive means, a 1,000 ft. indicator driven by said pressure responsive means, a dial divided into two segments each of which has index means indicating a total of 1,000 ft. by increments of value less than one thousand, a pointer driven from said pressure responsive means and having movement related to the 1,000 ft. indicating means so that it traverses 360° of the dial for each 2,000 ft. change in said thousand foot indicating means, and a fixed compass dial organized with the pointer whereby at uneven values of the thousand foot indicating means one compass bearing is indicated, at even values the opposite compass bearing is indicated, and whereby at uneven values plus 500 another compass bearing is indicated at 90° to those first mentioned, and at certain even values plus 500 a compass bearing is indicated opposite to the bearing last mentioned.

5. An altimeter comprising an atmospheric pressure responsive means, a compass dial, a gross-unit altitude indicator and a flight level indicator driven by said pressure responsive means, a pointer traversing the compass dial and driven by the pressure responsive means at a predetermined ratio with respect to said indicators, an altitude dial laid off adjacent to the compass dial with units interpolating said gross units, said pointer also traversing the last-named dial, adjustable means for changing the reading of the gross-unit altitude indicator and the pointer in accordance with barometric pressure changes to bring about true indication of elevation, a shield adapted to cover and uncover said flight level indicator, and cooperating means between the adjustable means and the shield whereby the latter shields from sight the flight level indicator except at a predetermined setting of the adjustable means.

6. An altimeter comprising atmospheric pressure responsive means, a gross-valued altitude indicator driven by said pressure responsive means, a dial showing altitude increments less than the gross values, said dial being separated into two segments each of which indicates by increments a total summing up to said gross value, a pointer driven from said pressure responsive means and having movement related to the gross-valued indicating means so that it traverses 360° of the dial for two of the gross values, and a fixed compass dial organized with the pointer.

7. An altimeter comprising atmospheric pressure responsive means, a 1,000 ft. indicator driven by said pressure responsive means, a dial indexed with altitude increments of less than 1,000 ft., said dial being separated into two segments each of which indicates a total of 1,000 ft. by increments less than a thousand, a pointer driven from said pressure responsive means and having movement related to the thousand foot indicating means so that it traverses 360° of the dial for each 2,000 ft. change in said thousand foot indicating means, and a fixed compass dial organized with the pointer whereby at certain indicated elevations certain compass bearings are also indicated.

8. An altimeter comprising an atmospheric pressure responsive means, a fixed compass dial, an altitude dial having numbers representing relatively small values and traversing the entire compass dial and starting at zero at two opposite points on the dial, an indicator having numbers representing relatively large values, a pointer for the altitude and compass dials, and a mechanism connecting said pressure responsive means, the pointer and the indicator whereby each relatively large value represented on the indicator is associated with a sequence of the relatively small values represented on the dial, said pointer pointing simultaneously to compass bearings on the compass dial.

9. An altimeter comprising an atmospheric pressure responsive element, a fixed compass dial, a pointer for said dial, a gross altitude indicator carrying a sequence of numbers, an altitude indicating dial arranged adjacent to the compass dial and traversed by said pointer, the altitude dial having thereon repeating sequences of numbers representing fractional parts of the values indicated between successive numbers on the gross indicating dial, and means connecting the pressure responsive means, the gross altitude indicator and said pointer whereby the pointer travels one of said sequences of numbers on the altitude dial for each change in indication represented by adjacent numbers on said gross indicator.

10. An altimeter comprising an atmospheric pressure responsive element, a compass dial, a pointer for said dial, a gross altitude indicator carrying a sequence of numbers, an altitude indicating dial arranged adjacent to the compass dial and traversed by said pointer, the altitude dial having thereon repeating sequences of numbers representing fractional parts of the values indicated between successive numbers on the gross indicating dial, means connecting the pressure responsive means, the gross altitude indicator and said pointer whereby the pointer travels one of said sequences of numbers on the altitude dial for each change in indication represented by adjacent numbers on said gross indicator, and a flight level indicator indicating in a proportion to the change indicated by the gross indicator.

11. An altimeter comprising an atmospheric pressure responsive element, a compass dial, a pointer for said dial, a gross altitude indicator carrying a sequence of numbers, an altitude indicating dial arranged adjacent to the compass dial and traversed by said pointer, the altitude dial having thereon repeating sequences of numbers representing fractional parts of the values indicated between successive numbers on the gross indicating dial, means connecting the pressure responsive means, the gross altitude indicator and said pointer whereby the pointer travels one of said sequences of numbers on the altitude dial for each change in indication represented by adjacent numbers on said gross indicator, a flight level indicator indicating in a proportion to the change indicated by the gross indicator, a movable shield for the flight level indicator, adjustable means for correcting altitude and the flight level indications to true barometric conditions, and means coupling the correcting means and the shield to remove the shield from the flight level indicating means at a predetermined standard setting of the adjustable means.

12. An altimeter comprising an atmospheric pressure responsive means, a compass dial including cardinal compass points, a thousand foot indicator and a pointer for the compass dial, a hundred foot altitude dial laid off adjacent to the compass dial and having two ranges each totaling 1,000 ft., each starting at zero at opposite cardinal compass points, a flight level indicator indicating in a proportion to the thousand foot indicator, operative means interconnecting the pressure responsive means with the thousand foot indicator, the flight level indicator and the pointer, settable barometric adjusting means for changing altitude and flight level indications according to the barometer, and means coordinated with said adjusting means for hiding from view the flight level indicator under all barometric pressures except standard.

13. An altimeter comprising an atmospheric pressure responsive means, a compass dial including cardinal compass points, a gross-unit altitude indicator and a pointer for the compass dial, an altitude dial laid off adjacent to the compass dial and having two ranges each totaling one of said gross units, each starting at zero at opposite cardinal compass points, a flight level indicator indicating in a proportion to the gross-unit indicator, operative means interconnecting the pressure responsive means with the gross-unit, altitude indicator, flight level indicator and pointer, settable barometric adjusting means for changing altitude and flight level indications according to the barometer, and means coordinated with said adjusting means for hiding from view the flight level indicator under all barometric pressures except standard.

14. An altimeter comprising an atmospheric pressure responsive means, a compass dial including cardinal compass points, a thousand foot indicator and a pointer for the compass dial, a hundred foot altitude dial laid off adjacent to the compass dial and having two ranges each of 1,000 ft., each starting at zero at opposite cardinal compass points, a flight level indicator indicating in a proportion to the 1,000 ft. indicator, operative means interconnecting the pressure responsive means with the thousand foot indicator, the flight level indicator and the pointer, settable barometric reference means for changing altitude and flight level indications according to the barometer, means coordinated with said adjustable reference means for hiding from view the flight level indicator under all barometric pressures except standard, and a barometric scale to which said reference means is referred.

15. An altimeter comprising a movable atmospheric pressure responsive element, rotary pressure indicating means, mechanism connecting said pressure responsive means with said rotary indicating means comprising a rotary transmission shaft, driving means between said shaft and said rotary indicating means, a link connection between said shaft and said pressure responsive means, a fixed bearing for the shaft, a second bearing therefor normally stationary, adjustable means for bodily moving the second bearing perpendicular to the shaft axis to angularly move the transmission shaft axis, adjusting movement of said second bearing causing a relative rotary motion of the transmission shaft with respect to said linkage whereby adjusted rotary motion may be applied to the indicator in addition to a rotary motion obtained through action of said pressure responsive means.

16. An altimeter comprising a substantially flat supporting spider, indicating means on the spider, an aneroid supported on said spider with its general plane normal to the general plane of the spider and expansively movable parallel to the spider, a rotary shaft having its axis normal to the spider and substantially parallel to the aneroid, said shaft having a fixed pivot near the spider, gear means adjacent the fixed pivot for driving said indicating means on the spider, a movable pivot supporting the other end of the shaft adjacent the aneroid, rotary means supporting said movable pivot, an adjusting gear train for actuating said rotary means, a lever extending from said shaft adjacent the aneroid and between said movable pivot and the fixed pivot, and a connecting link pivoted to said lever and pivoted to a part on the aneroid whereby linear motion of the aneroid may be translated into rotary motion of the shaft, adjusted rotary motion of said support for the movable pivot causing rocking of the shaft about the fixed pivot, whereby the shaft is also adjustably rotated.

17. In apparatus of the class described, an altitude indicator including means for indicating altitude in terms of distance and in terms of flight level indicia, means responsive to barometric pressure for operating said altitude indicator, means for adjusting said altitude indicator in accordance with prevailing barometric pressure or in accordance with a predetermined standard pressure, whereby said altitude indicator indicates either substantially the actual value of the altitude or an arbitrary value, and means including an adjustable shield actuated by said adjusting means for concealing the flight level indicia of said altitude indicator when said indicator is adjusted in accordance with all barometric pressures except said predetermined standard pressure.

18. An altimeter comprising an atmospheric pressure responsive means, a fixed compass dial, an altitude dial having numbers representing relatively small values and traversing the entire compass dial and starting at zero at two opposite points on the dial, an indicator having numbers representing relatively large values, a pointer for the altitude and compass dials, a mechanism connecting said pressure responsive means, the pointer and the indicator whereby each relatively large value represented on the indicator is associated with a sequence of the relatively small values represented on the dial, said pointer pointing simultaneously to compass bearings on the compass dial, and adjustable means for changing the readings of the pointer and the indicator in accordance with barometric pressure changes to bring about true indication of elevation.

19. An altimeter comprising an atmospheric pressure responsive element, indicating means, a rotary transmission shaft for transmitting movement from the pressure responsive element to the indicating means, said shaft being journalled at one end in a stationary bearing and at its other end in a laterally movable bearing, an extension from said shaft adjacent said movable bearing, a link connecting the pressure responsive element and said extension to rotate the shaft about its axis upon changes in atmospheric pressure, and adjustable means for laterally moving said movable bearing, whereby adjusting rotation may be applied to said shaft.

JAMES O. PHELPS.
GEORGE W. COTTRILL.

REFERENCES CITED

The following references are of record in the file of this patent:

UNITED STATES PATENTS

| Number | Name | Date |
| --- | --- | --- |
| 2,208,728 | Menzer | July 23, 1940 |
| 2,258,826 | Torkelson | Oct. 14, 1941 |
| 2,328,559 | Knight | Sept. 7, 1943 |